United States Patent [19]

Carson

[11] Patent Number: 4,643,459
[45] Date of Patent: Feb. 17, 1987

[54] QUICK-CONNECT HOSE COUPLING

[75] Inventor: Forrest L. Carson, Borger, Tex.

[73] Assignee: J. M. Huber Corporation, Rumson, N.J.

[21] Appl. No.: 743,551

[22] Filed: Jun. 11, 1985

[51] Int. Cl.⁴ .............................................. F16J 15/00
[52] U.S. Cl. ........................................ 285/84; 285/85; 285/360; 285/376
[58] Field of Search ...................... 285/84, 85, 73, 77, 285/78, 317, 360, 376, 401

[56] References Cited

U.S. PATENT DOCUMENTS

| | | | |
|---|---|---|---|
| 898,017 | 9/1908 | Steen | 285/360 |
| 953,061 | 3/1910 | Ruland | 285/317 |
| 1,112,850 | 10/1914 | Sherer | 285/84 |
| 1,857,420 | 5/1932 | Wolford | 285/85 |
| 1,860,038 | 5/1932 | Lange | 285/84 |
| 3,700,269 | 10/1972 | Salata | 285/78 |
| 4,271,865 | 6/1981 | Galloway et al. | 285/401 |
| 4,438,779 | 3/1984 | Allread | 285/85 |

FOREIGN PATENT DOCUMENTS

| | | | |
|---|---|---|---|
| 1454948 | 10/1966 | France | 285/360 |
| 1020665 | 2/1966 | United Kingdom | 285/317 |

Primary Examiner—Cornelius J. Husar
Assistant Examiner—Anthony Knight
Attorney, Agent, or Firm—Harold H. Flanders; Alec H. Horn; Robert Carwell

[57] ABSTRACT

An apparatus for establishing a quick-connect fluid-tight coupling together of hose sections or the like. A pair of identical couplings are provided each interconnected to and terminating a respective hose section and adapted to be aligned along a common co-axis in mutual sealing engagement. Each coupling includes a body member having a circular seal face disposed in a plane perpendicular to the axis. Means are provided on each body member for releasably sealing the seal faces together in fluid-tight engagement by rotation of the body members in opposing directions about the axis. Each body member includes a locking assembly mechanism for automatically locking the respective body members together upon make-up to prevent further relative rotation in either direction or separating movement in the axial direction. Each locking mechanism is releasable whereby, upon disengaging rotation of the body members in the opposite direction from make-up, the locking assemblies of each body are re-armed in preparation for a next make-up. The locking mechanisms are aligned about the common axis whereby in an un-armed position, the respective body members are thereby prevented from being joined together.

6 Claims, 7 Drawing Figures

QUICK-CONNECT HOSE COUPLING

BACKGROUND OF THE INVENTION

This invention relates to couplings and, more particularly, relates to apparatus for quickly and releasably establishing a quick-connect, automatically locking fluid-tight coupling between hose sections or the like.

Apparatus has long been known for releasably interconnecting sections of tubular goods such as fire or oilfield hose or tubing into fluid-tight engagement, such apparatus including many variations of the familiar male-female threaded joint couplings. One obvious disadvantage of such couplings was the need for joints of separate male or female design, whereby only hose section with opposite couplings could be joined. Yet another disadvantage of such threaded couplings was the inordinate time and difficulty often experienced in making up the threaded joints by relative rotation of the couplings, such difficulties often being extremely crucial for example, in emergency fire ground situations. Spanner wrenches or the like were also frequently necessary to insure fluid-tight engagement. Moreover, the exposed threads were often subject to damage in the deleterious environment of fire scenes or oilfield applications by foreign substances clogging the threads, metal fatigue, cross-threading, or other damage.

For these and other reasons, couplings of a "quick-connect" variety were developed in the art which could establish a fluid-tight seal therebetween by means of only a partial relative rotation of the couplings about a common longitudinal axis. However, serious problems have been associated with such couplings of the quick-connect design.

For example, in some applications, the hose terminating in one of the couplings was not always aligned coaxially with the couplings themselves but rather was disposed at an angle thereto. When the hose was thereafter charged with pressure, the joint formed by the couplings frequently became disconnected and often in a violent fashion due to the rotational torque about the axis of the couplings. This, in turn, resulted many times in injury to surrounding personnel as well as causing dangerous conditions to exist due to the break in the pressurized lines, which often carried hazardous or high pressure materials. Moreover, no means were provided for establishing a quick-releasing automatically locking mechanism between the couplings.

Accordingly, a hydraulic coupling was long sought after which was of a quick-connect form yet provided a dependable foolproof and releasable locking engagement between the coupling members. Such a coupling design is provided in the present invention wherein a fluid pressure-tight seal may be effected between two such couplings, each of a mirror-image universal design. Each coupling is provided with a locking assembly which automatically locks the couplings together in a fluid-tight seal upon the rotational action required for make-up of a joint. The locking mechanisms are further automatically re-armed upon rotation in the opposite direction to separate the couplings. Moreover, the couplings may only be joined together along a common longitudinal axis to form a joint when such locking assemblies are in an armed position which automatically occurs upon each disconnection of the couplings, and such couplings are prevented by their design by being co-joined in an incorrect fashion.

SUMMARY OF THE INVENTION

In a preferred embodiment of the present invention, apparatus is provided for establishing a quick-connect fluid-tight coupling together of hose sections or the like. A pair of identical couplings are provided each interconnected to and terminating a respective hose section and adapted to be aligned along a common co-axis in mutual sealing engagement. Each coupling includes a body member having a circular seal face disposed in a plane perpendicular to the axis. Means are provided on each body member for releasably sealing the seal faces together in fluid-tight engagement by rotation of the body members in opposing directions about the axis. Each body member includes a locking assembly mechanism for automatically locking the respective body members together upon make-up to prevent further relative rotation in either direction or separating movement in the axial direction. Each locking mechanism is releasable whereby, upon disengaging rotation of the body members in the opposite direction from make-up, the locking assemblies of each body are re-armed in preparation for a next make-up. The locking mechanisms are aligned about the common axis whereby in an un-armed position, the respective body members are thereby prevented from being joined together.

These and other features of the present invention will become apparent from the following detailed description wherein reference is made to the accompanying drawings.

IN THE DRAWINGS

FIG. 6 is a top view of the upper coupling of FIG. 1 taken along line 6—6.

FIG. 7 is a top view of the upper coupling of FIG. 1 taken along line 7—7.

DETAILED DESCRIPTION OF THE INVENTION

Figure 1:
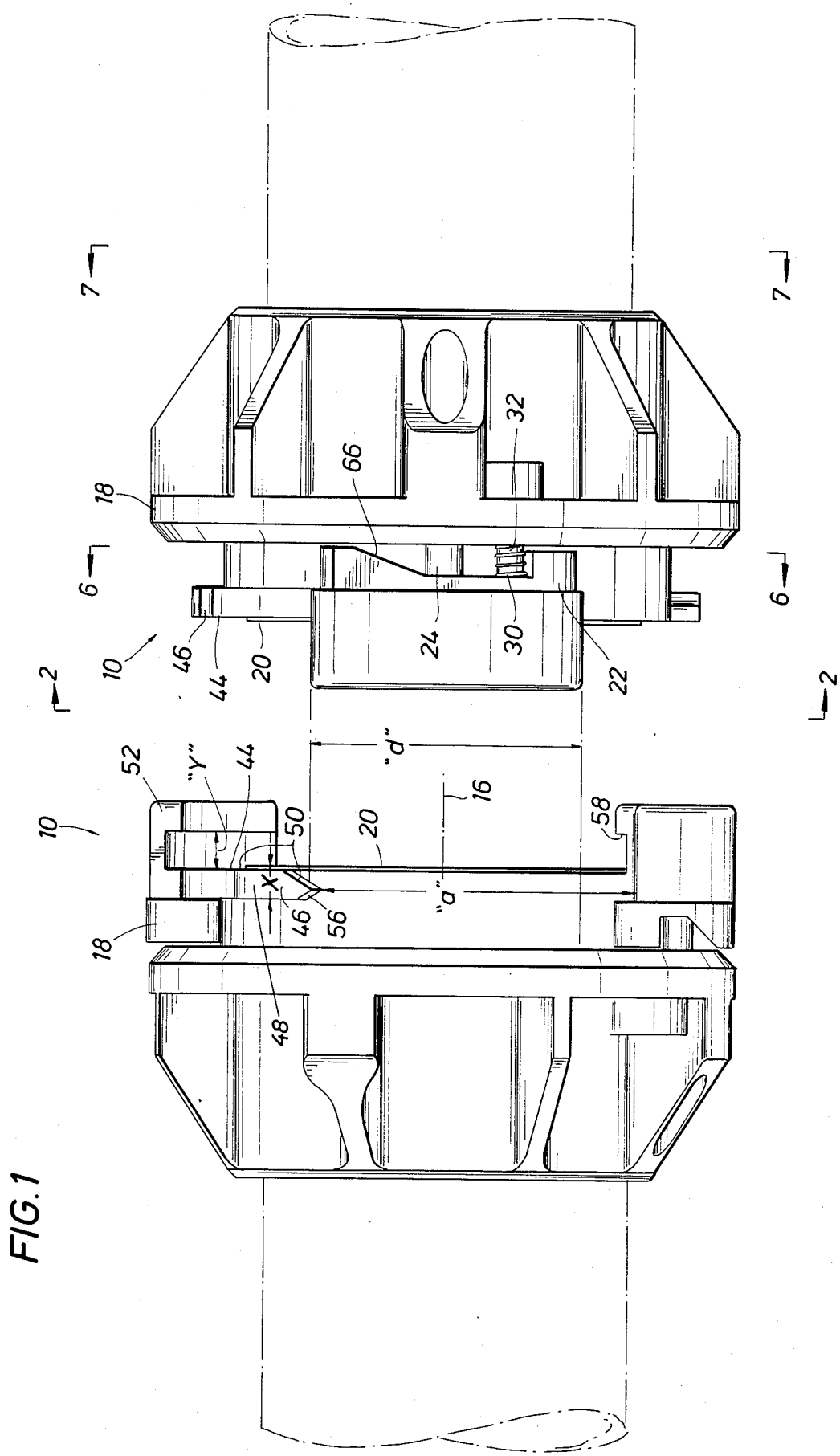
FIG. 1 is a pictorial side view of two couplings of the present invention.

Referring to FIG. 1, there may be seen depicted therein a pair of couplings 10 of the present invention coaligned along a central longitudinal axis 16 prior to being made-up or joined in a manner to be hereinafter described to form a completed connector joint 14 such as that depicted in FIG. 4. It is a feature of the present invention that such a connector joint 14 may be effected by employing two identical couplings 10. Accordingly, in the description which follows, reference may be made to reference numbers associated with components and features of both of the connectors 10 depicted in the Figures. However, it is to be understood that all such components and features would typically be present in any given one of the couplings 10.

Figure 2:
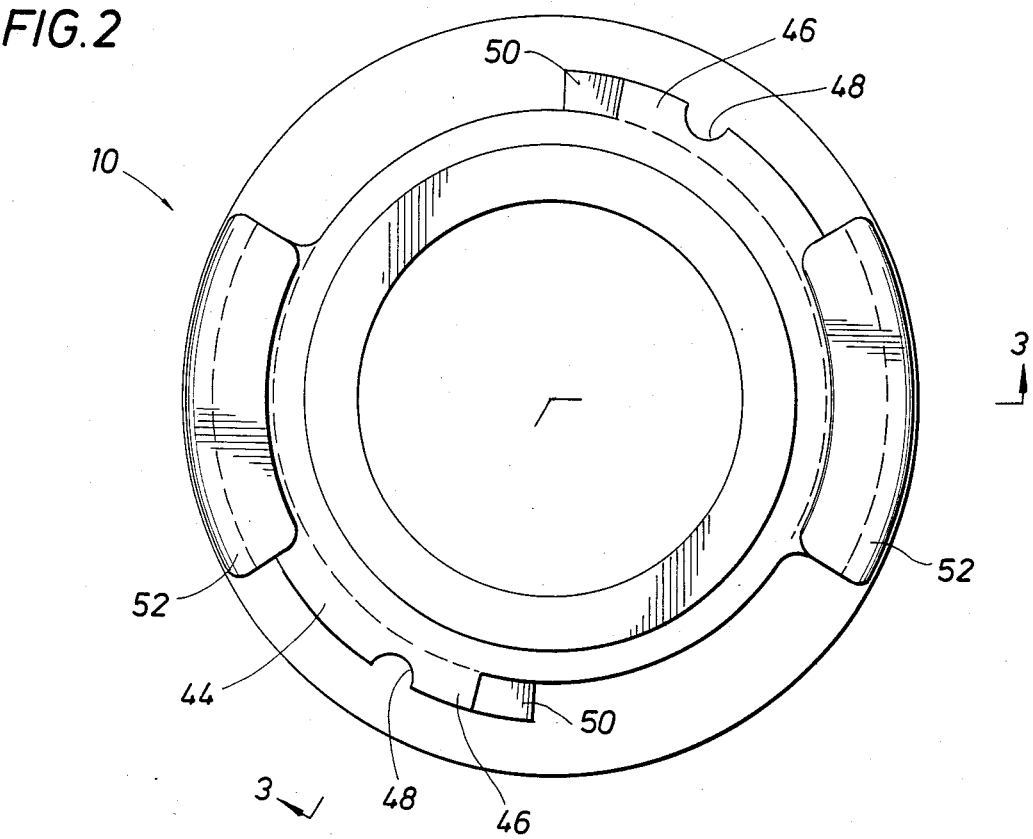
FIG. 2 is a bottom pictorial view of the upper coupling of FIG. 1 taken along lines 2—2.
Figure 3:
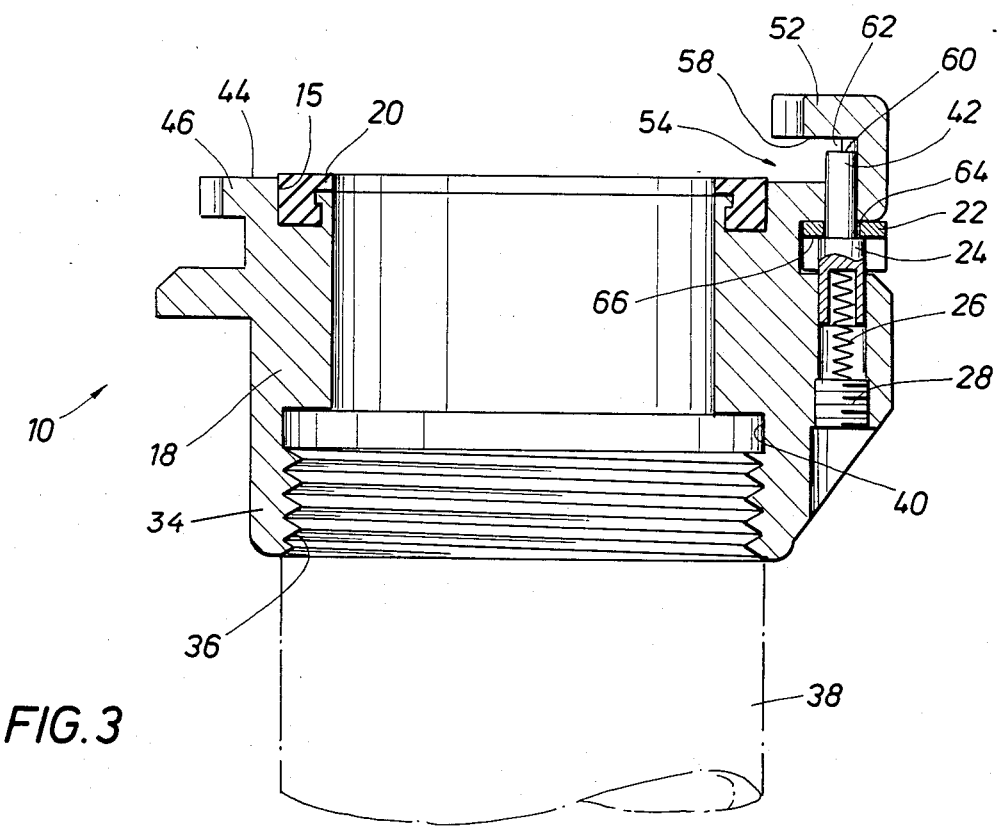
FIG. 3 is a side view of the coupling of FIG. 2 in section taken along line 3—3 of FIG. 2.

With respect to the separate components comprising each coupling 10, first an integral one-piece construction body 18 is provided which may be fashioned of extruded aluminum or by some other conventional means well known in the machine tool and fabricating trades. Each body 18 will define a generally cylindrical bore 12 therethrough, as shown in FIG. 2. With reference to FIG. 3, the face 44 of each body 18 has recessed therein a generally circularly shaped seal seat 15 having disposed therein a seal ring 20 comprised of a suitable sealing material adapted to the particular applications for which the connector joint 14 are intended.

Referring again to FIG. 1, each coupling 10 will preferably further be provided with at least one locking assembly. Each locking assembly will include a locking slide 22, a locking plug 24, a plug restoring spring 26 (see cutaway portion of FIG. 4), a spring retainer nut 28 of the hex head variety or the like (as seen in cutaway in FIG. 4), and a slide retention spring 30 and retention spring core 32. The purpose and operation of such locking assembly will be hereinafter described in greater detail. As can be seen from FIG. 4, the body 18 of each coupling 10 will be provided with threaded recesses 29 and 31 for threadedly receiving the aforementioned retainer nut 28 and retention spring core 32, respectfully.

Referring now to FIG. 3, when the locking assembly just described is positioned in the locked position shown therein, plug 24 has a locking portion 42 extending in the axial direction beyond the face 44 of body 18. This is because the spring 26 biases plug 24 axially outwards until shoulder 64 of the plug 24 abuts against a locking slide surface 66 of locking slide 22. With brief reference to FIG. 6, slide 22 may be seen to define a curved slot 68 extending therethrough so as to permit passage of the plug 24 and retention spring core 32 therethrough. This slot 68 serves as a guide through which plug 24 and core 32 extend, whereby the slide 22 may be moved relative thereto about axis 16 between the two positions shown in FIGS. 4 and 5.

Returning to FIG. 3, each connector 10 will also include a diametrically opposed pair of extension guides 52 each having an inner surface 58 portion defining a U-shaped slot in cross-section. A space 62 is provided between the bottom face 60 of the locking portion 42 of plug 24 and a portion of this inner surface 58 when plug 24 is in the locked position shown in FIG. 3. The purpose of this space 62 will later become apparent after further description of the connector 10.

From FIGS. 1-3, it may be seen that each coupling 10 further includes a pair of sidewall extensions 46 each defining a semi-circular locking plug receptor 48. Each such sidewall extension 46 further includes a first or locking plug release shoulder surface 50 and a second or seal-effecting shoulder surface 56, both such surfaces 50 and 56 converging to form a generally pointed edge portion.

In one embodiment of the present invention, a cylindrically shaped collar 34 portion of each body 18 is provided having internal threads 36 for threadedly receiving a corresponding threaded male end of a hose section 38, as shown in FIG. 3. Each body 18 will further have in the embodiment depicted therein, a seal recess 40 for carrying an O-ring type seal (not shown) so as to effect a fluid tight seal between the hose section 38 and the body 18.

Figure 4:
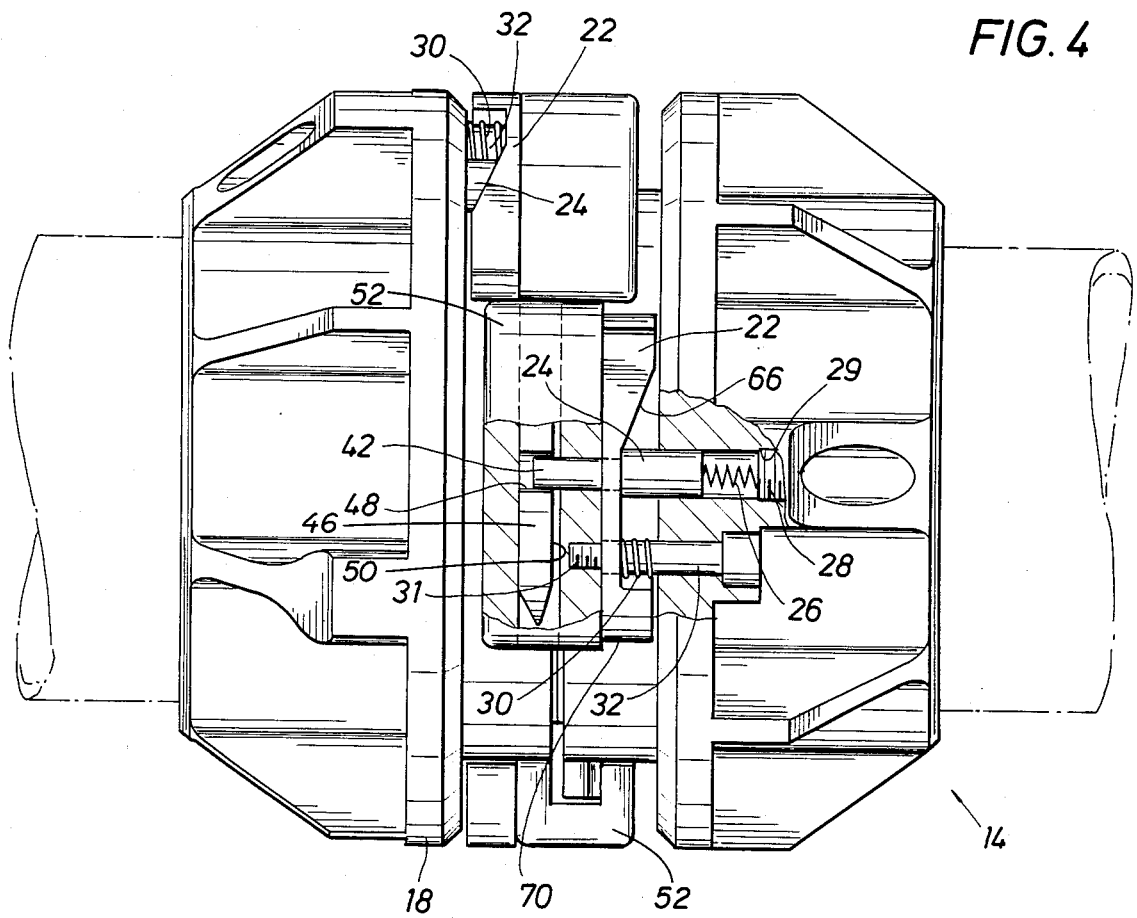
FIG. 4 is a side pictorial view partly in section, of the couplings of FIG. 1 in a make-up position with the locking mechanism thereof in a locked position.
Figure 5:
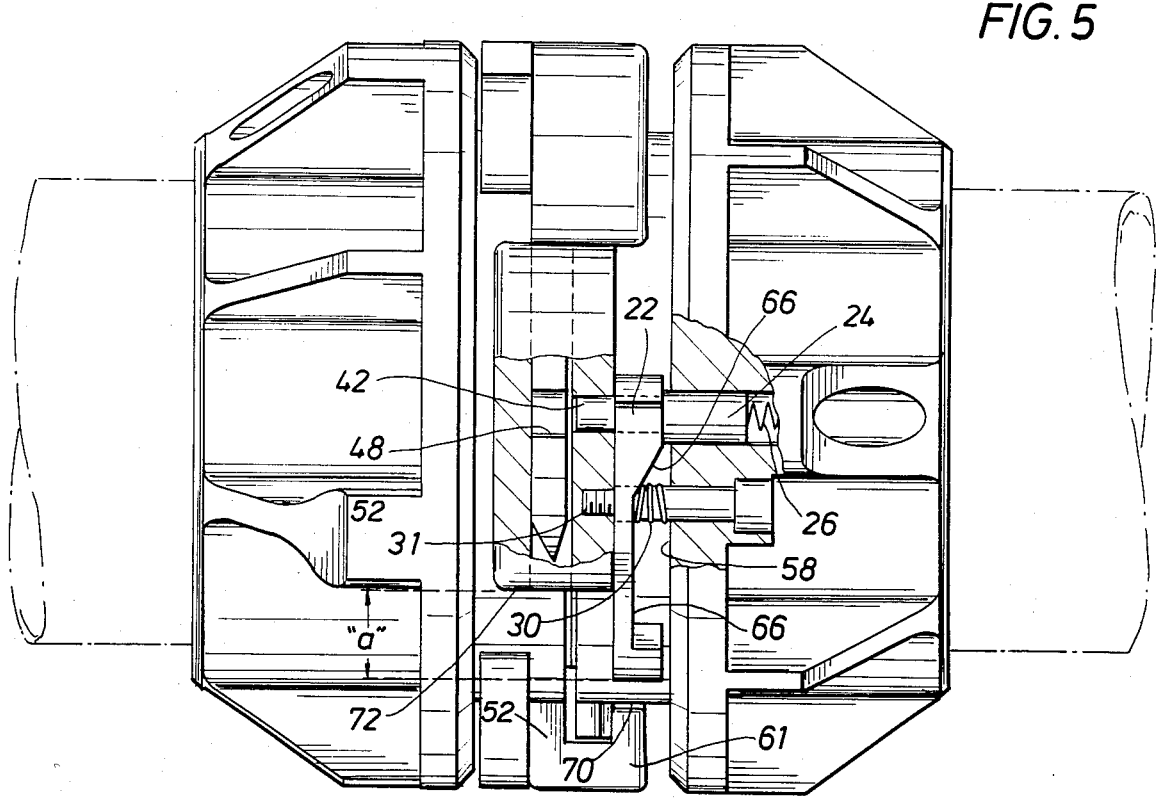
FIG. 5 is a side pictorial view partly in section, depicting the coupling of FIG. 4 with the locking mechanism thereof in an unlocked position.

Now that a general description of the components of each coupling 10 has been made, the purposes and operation thereof will become more apparent from the description which follows of the making up of a completed connector joint 14 as shown in FIGS. 4 and 5. Two such couplings 10 are first oriented relative to one another in the manner depicted in FIG. 1 with their corresponding hose sections 38 attached thereto. With the two couplings 10 thus disposed in opposed relation with respective faces 44 parallel and adjacent each other and angularly aligned as shown in FIG. 1, the respective seal rings 20 of each coupling 10 will thus be brought into initial contact upon movement of the couplings 10 toward each other in the axial direction along axis 16. The faces 44 will initially be held off of one another by the combined distances by which each seal 20 protrudes beyond its respective seal face 44.

For a given coupling 10, the distance from one side of extension 46 to the exposed surface of seal 20 on the other side of extension 46 may be defined as "X" as shown in FIG. 1. Also, for a given coupling 10, the width in the longitudinal direction of axis 16 of slot 54 may be defined as "Y". It will be appreciated that in the particular embodiment of the invention depicted, when the two couplings 10 are brought into initial contact as just described, it is desirable for the combined distances X for both couplings 10 to be slightly greater than the combined distances Y for both couplings. In this manner, when the couplings 10 are brought together into final sealing engagement as shown in FIG. 4 (by relative rotation about axis 16 in opposite directions in the desired manner to be hereinafter described), the respective seals 20 will be compressed tightly together to effect the desired sealing. However, it will be further appreciated that the amount of protrusion of and elasticity of the seals 20, the pressure internal to the connector joint 14 which must be sealed, and the like are all interrelated variables which may be adjusted as desired depending upon the particular application.

Still continuing with a description of the manner of making up a completed connector joint 14, as aforementioned, the two couplings 10 are first oriented angularly relative to one another as shown in FIG. 1, and moved towards one another in the longitudinal direction of axis 16 so as to bring faces of the respective seals 20 into initial engagement. The couplings 10 are thence rotated relative to one another, with the upper coupling 10 of FIG. 1 (when viewed from the top) being rotated in a generally clockwise direction relative to the lower connector.

As this rotation begins, the second or seal-effecting shoulder surfaces 56 of one coupling 10 contact the inner surface 58 portions of the extension guides 52 of the opposed coupling 10. Due to the nature of this surface 56 having an inclined portion upon rotation, this forces the couplings 10 toward each other in the axial direction until the respective seals 20 are compressed in an amount sufficient for sealing off the pressure to be encountered within the completed connector joint 14.

Upon further rotation of the couplings 10, the portions of surface 56 lying in a plane perpendicular to the axis 16 will eventually slidingly engage corresponding portions of inner surface 58 of the extension guide 52 of the opposed coupling 10 which are, in like manner, also lying in a plane perpendicular to axis 16. Upon still further relative rotation of the couplings 10, the first or locking plug release shoulder surface 50 of sidewall extension 46 of each coupling 10 will contact the corresponding bottom 60 of the locking portion 42 of the plug 24 carried by the opposed coupling 10. It will be recalled that due to the spring biasing and shouldering of each plug 24 shown in FIG. 3, a previously described space 62 is provided between the bottom 60 of plug 24 and the inner surface 58 of extension guide 52 when the locking slide 22 is in the locked position shown in FIG. 4. This space 62 permits entry therein during this rotation of the wedge-shaped portion of extension 46 defined by portions of the surfaces 50 and 56 of the extension 46.

As the shoulder surface 50 of extension 46 of each coupling 10 and the corresponding bottom 60 of the plug 24 of the other coupling 10 contact one another, upon further rotation of the coupling 10, the shoulder 64 of each locking plug 24 will ride on the inclined surface portion of the locking plug release shoulder surface 50. This will cause each locking plug 24 to move in the longitudinal direction outwards of the slot 54 defined by the inner surface 58 of extension 52 of the opposing coupling 10. As relative rotation between the couplings 10 continues, eventually the locking plug 24 of each connector 10 and the corresponding locking plug receptor 48 portion of the extension 46 of the opposed coupling 10 will come into vertical alignment. At this time, again due to the spring biasing of plugs 24, the locking portions 42 thereof will be forced into the locking plug receptors 48 of the opposed connector 10. In this manner, the desired sealing connection is effected between couplings 10 in an automatically locked fashion whereby further angular rotation in either direction of the couplings 10 is prevented until they are unlocked in a fashion to be described. In the locked position, the components of the couplings 10 will thus assume the relative positions depicted in FIG. 4.

When it is desired to establish an unlocked relationship between the couplings 10 (whereby they may be rotated relative to each other about axis 16), the respective locking slides 22 of each coupling 10 are simply rotated in an angular direction about axis 16 from the position shown in FIG. 4 to the position illustrated in FIG. 5. This results in longitudinal movement of the locking portion 42 of the locking plug 24 of one coupling 10 outwards of the locking plug receptor 48 of the other coupling 10 in the following manner thereby establishing the aforementioned unlocking. As the slide 22 is moved to the position shown in FIG. 5 from that of FIG. 4, the bottom 60 of plug 24 rides on the locking slide surface 66 of slide 22, thereby once again compressing spring 26 and moving the locking portion 42 of each plug 24 free of its respective receptor 48. Relative angular motion between the couplings 10 is thereby once again permitted.

Comparison of FIGS. 4 and 5 will reveal one additional result of the aforementioned motion of slide 22. As slide 22 moves to the unlocked position shown in FIG. 5, the slide retention spring 30 is thereby further compressed between the slide surface 66 and a part of the inner surface portion 58 of extension 52. This compression retains slide 22 in this angular position relative to its respective coupling body 18 so as to further retain the locking portion 42 of each plug 24 in its unlocked position shown in FIG. 5 retracted from receptor 48. In this manner, couplings 10 are thus freed to rotate relatively in angular directions opposite that just described for make up of the connector joint 14 in order to effect a disconnection of the couplings 10.

When the locking slides 22 of each coupling 10 are positioned as shown in FIG. 5 (and also shown in phantom in FIG. 6), the locking portions 42 of the locking plugs 24 are positioned within their respective bodies 18 and outwards of the slots 54 defined by the extension guides 52. In this position, the plugs 24 cannot otherwise interact with mating plug receptors 48 and with the locking plug release shoulder surfaces 50 to effect locking as previously described should an attempt be made to make up a connector joint 14 as described.

For this reason, a feature of the present invention will now be described for inhibiting such attempts to interconnect couplings 10 when the slides 22 are in the unlocked position of FIG. 5 (which would otherwise result in a sealing but unlocked connector joint 14).

When the locking slides 22 have each been positioned in the unlocked position shown in FIG. 5 while the couplings 10 are still in the sealing engagement previously described, one end 70 of each slide 22 will protrude an angular distance "B" (seen better in FIG. 6) beyond the end 72 of a corresponding extension guide 52 over which the particular locking slide 22 is positioned when in the locked position.

This leaves a remaining opening having an approximate dimension "C" in a first coupling 10 for receiving in opposed relation the extension guide 52 of the other coupling 10 when the two couplings 10 are angularly and coaxially aligned as shown in FIG. 1 in preparation for the making up of a connector joint 14. On the other hand, when the locking slides 22 of the connectors 10 have each been positioned in the locked position shown in FIGS. 1, 4, and 6 (wherein they are vertically aligned with their corresponding extension guides 52), spaces having an angular width "A" are thereby created in the respective couplings 10 which are wide enough to permit passage of the mating extension guides 52 of the other opposed coupling 10. By selecting the width of the extension quides 52 to be a dimension "D" in FIG. 6 which is greater than dimension "C" but less than dimension "A", it will be difficult if not impossible to bring the two couplings 10 (when in the opposed relation shown in FIG. 1) into mating engagement. This is because the extension guides 52 will not pass through the openings "C" when couplings 10 are moved toward one another in the axial direction but rather will contact the wedge-shaped portions of sidewall extensions 46 and extension guides 52 of the other coupling 10.

Due to the mechanism just described, couplings 10 must accordingly have their respective locking slides 22 positioned in the locked position shown in FIG. 1 in order to even move the couplings 10 (when in position as shown in FIG. 1) into the axial direction together whereby their seals 20 will initially contact. Moreover, a consequence of this, which necessarily follows, is that the locking plugs 24 will of necessity be thus positioned as also shown in FIG. 1 in the locked position. In this manner, they are thus positioned so as to interact with the locking plug release shoulder surfaces 50 of the opposed couplinq 10 as previously described. This assures that a locking sealed relation will automatically be established between couplings 10 when rotated relative to one another to the position shown in FIGS. 4 and 5. In other words, the couplings 10, in short, cannot be brought together for sealing rotation or make up unless the slides 22 are positioned in the orientation in which they are "re-armed" in the locked position ready for the locking action upon such rotation just described.

It is therefore apparent that the present invention is one well adapted to obtain all of the advantages and features hereinabove set forth, together with other advantages which will become obvious and apparent from a description of the apparatus itself. It will be understood that certain combinations and subcombinations are of utility and may be employed without reference to other features and subcombinations. Moreover, the foregoing disclosure and description of the invention is only illustrative and explanatory thereof, and the invention admits of various changes in the size, shape and material composition of its components, as well as in the details of the illustrated construction, without departing from the scope and spirit thereof.

What is claimed is:

1. A first coupling for use with a second coupling to form a fluid pressure seal between sections of hose, comprising:
   a cylindrical body defining a central bore therethrough formed about a longitudinal axis, said body having
      a face at a first end lying in a plane perpendicular to said axis;
      a circular seal seat in said face formed about said axis; and
      a collar at a second end for receiving one of said sections of hose;
   a resilient seal ring disposed in said seal seat;
   a pair of diametrically opposed extension guides carried by said body adjacent said first end;
   a pair of diametrically opposed sidewall extensions carried by said body adjacent said first end and defining a portion of said face, each said extension being disposed between said extension guides and each further defining
      a receptor; and
      an edge portion;
   at least one locking means carried by said body and adjacent a respective one of said extension guides, for releasably preventing angular rotation of said first coupling about said axis when said first coupling is sealingly engaged with said second coupling, each said locking means comprising
      a locking slide angularly rotatable about said axis between a first lock and a second unlock position;
      a locking plug disposed at least partially within said body and movable along the direction of said axis from a first lock to a second unlock position in response to corresponding movement of said locking slide from said first lock to said second unlock positions of said locking slide;
   said extension guides each having an inner surface defining a slot, and wherein said locking plug includes a locking portion moving from a first position within to a second position without said slot in response to said corresponding movement of said locking slide from said first to said second positions; and
   said locking slide being in vertical coalignment with said extension guide when in said first lock position; and wherein said locking slide extends beyond said extension guide in the angular direction about said axis when in said second unlocked position.

2. A first coupling for use with a second coupling to form a fluid pressure seal between sections of hose, comprising:
   a body formed about a longitudinal axis having
      a central bore therethrough;
      connector means for interconnection to one of said hose sections;
      a face lying in a plane perpendicular to said axis;
      at least one extension guide means; and
      at least one side extension means;
   a seal ring means disposed within said face for sealing engagement with said second coupling;
   locking means for preventing relative rotational movement when said seal ring means of said first coupling is in said sealing engagement with said second coupling, said locking means including plug means for releasable interconnection with said second coupling;
   slide means for moving said plug means in a direction generally parallel to said axis from a first locked position to a second unlocked position; and
   said slide means being positionable from a first locked position aligned above said extension guide means to a second unlocked position wherein at least a portion of said slide means extends angularly beyond said extension guide means.

3. Apparatus of claim 2, wherein said extension guide means defines a U-shaped slot in cross-section.

4. Apparatus of claim 3, wherein said slide means includes a slot for receiving a portion of said plug means.

5. Apparatus of claim 4, wherein said locking means further includes:
   spring biased means for movably retaining said locking plug in said first locked position.

6. Apparatus of claim 5, wherein
   said slide means defines an inclined slide surface; and
   said locking plug includes a shoulder portion in sliding contact with said slide surface.

* * * * *

UNITED STATES PATENT AND TRADEMARK OFFICE
CERTIFICATE OF CORRECTION

PATENT NO. : 4,643,459

DATED : February 17, 1989

INVENTOR(S) : Forrest L. Carson

It is certified that error appears in the above-identified patent and that said Letters Patent is hereby corrected as shown below:

The sheet of drawing consisting of Figs. 6 and 7 should be added as per attached sheet.

Signed and Sealed this

Fourth Day of December, 1990

Attest:

HARRY F. MANBECK, JR.

Attesting Officer

Commissioner of Patents and Trademarks

UNITED STATES PATENT AND TRADEMARK OFFICE
CERTIFICATE OF CORRECTION

PATENT NO. : 4,643,459

DATED : February 17, 1989

INVENTOR(S): Forrest L. Carson

It is certified that error appears in the above-identified patent and that said Letters Patent is hereby corrected as shown below:

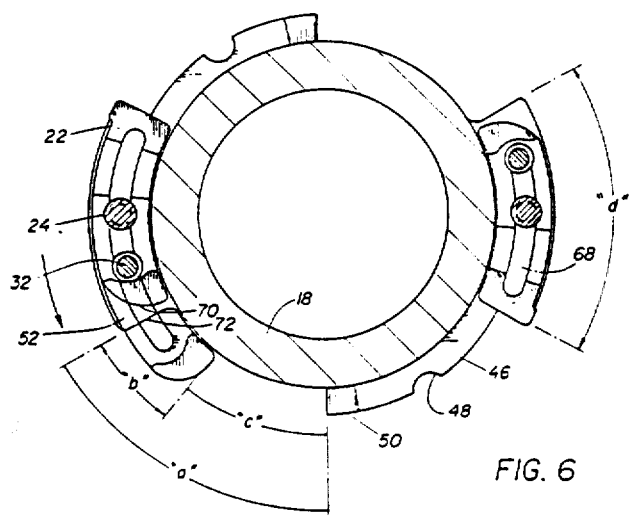

FIG. 6

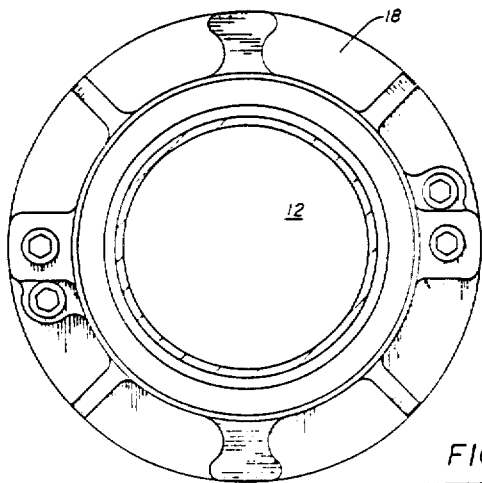

FIG. 7